Aug. 21, 1945.  R. R. CURTIS  2,383,369
FUEL SYSTEM
Filed July 2, 1942   2 Sheets-Sheet 2
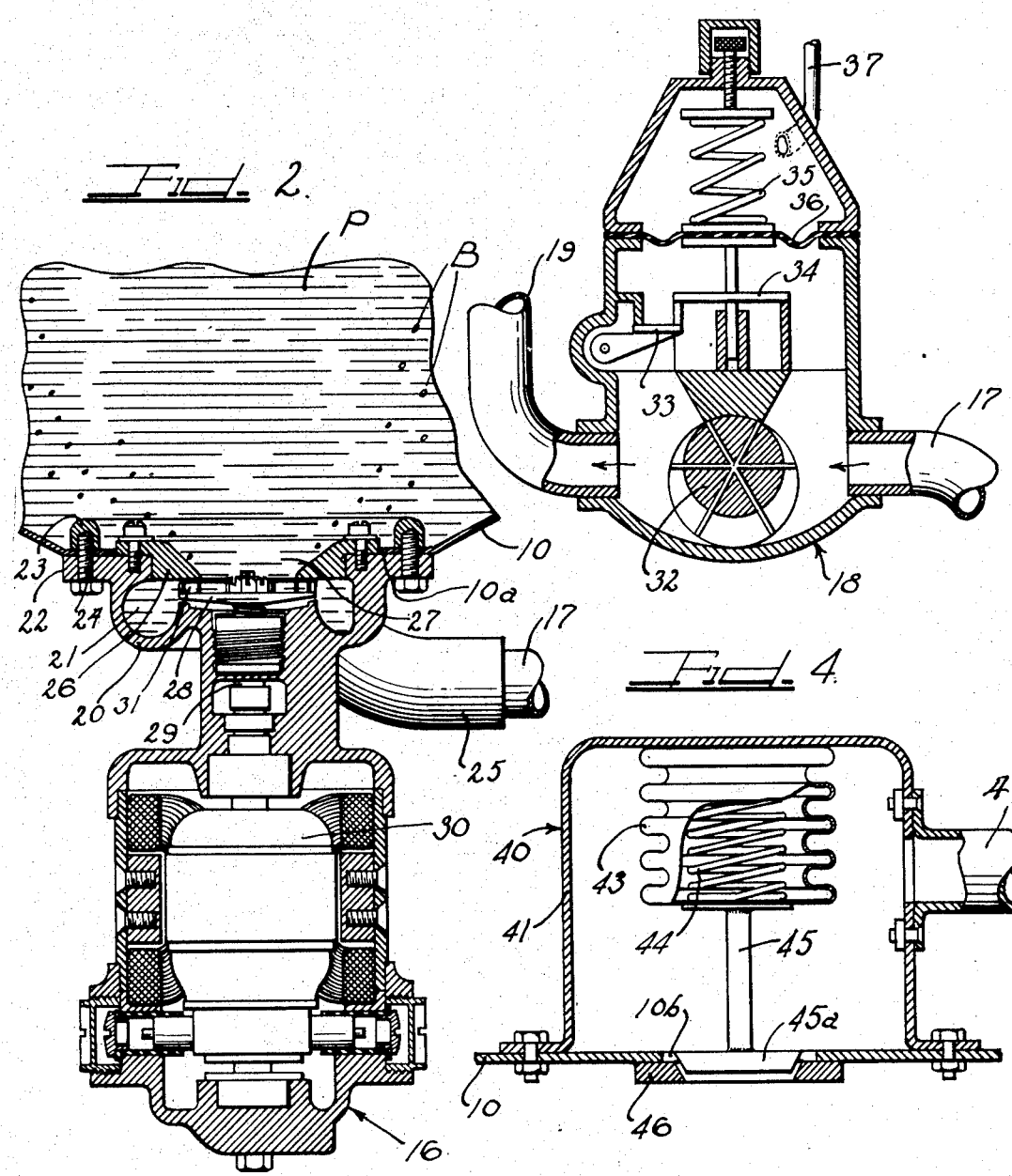
Inventor
RUSSELL R. CURTIS Patented Aug. 21, 1945

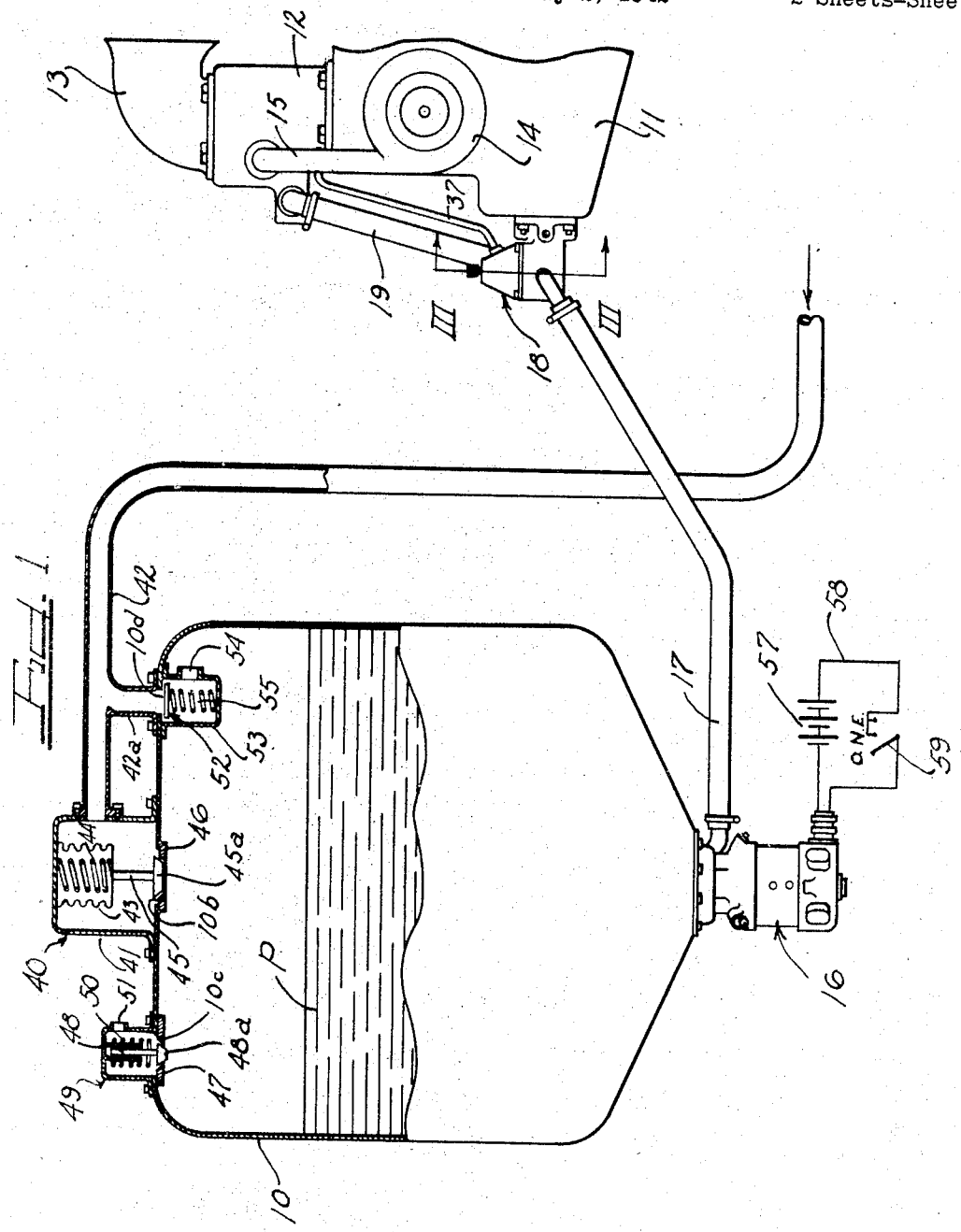

2,383,369

UNITED STATES PATENT OFFICE 2,383,369

FUEL SYSTEM

Russell R. Curtis, Dayton, Ohio, assignor to Curtis Pump Company, Dayton, Ohio, a corporation of Ohio Application July 2, 1942, Serial No. 449,421

8 Claims. (Cl. 158—36.3)

This invention relates to fuel systems especially adapted for use in aircraft.

More particularly the invention relates to a combination vented and pressurized aircraft fuel system which not only separates gases and vapor from liquid fuel to prevent vapor lock but also minimizes loss of fuel through volatilization.

The fuel systems of this invention include vented tanks or other vented containers for volatile fuel such as gasoline, booster pumps positioned at the lowest practical point on the tanks for beating out bubbles of gas and vapor from the fuel while pressuring the fully liquid fuel to the main fuel pumps of the aircraft engines, devices for closing the tank vents when pressure on the fuel in the tanks is reduced below a predetermined value, and pressure relief means for the tanks to maintain a predetermined pressure differential between the inside and outside of the tanks.

In the fuel systems of this invention, the booster pump is provided with pumping means and agitating means. The agitating means beat out gases and vapors from the liquid fuel and deliver the fully liquid fuel to the pumping means. The pumping means, in turn, pressure this fully liquid fuel to the aircraft engine fuel pump. This fuel pump has a by-pass around the pumping element thereof so that pressured fuel from the booster pump can be delivered direct to the engine carburetor in the event of failure of the fuel pump. Likewise the inlet and outlet of the booster pump are in constant communication so that the fuel pump can receive fuel through the booster pump in the event of failure of the booster pump. Such a series or tandem arrangement of pumps will permit the flying of aircraft to very great altitudes since the agitators of the booster pump will prevent gases and vapors from entering the fuel line. These agitators beat out the gases and vapors in bubble form and, since the tank is vented, the liberated bubbles will rise through the pond of fuel in the tank, burst on the surface of the pond to liberate gases and vapors, and the liberated gases will be vented out of the tank vent.

However, as the aircraft is flown to very high altitudes, the pressure on the fuel in the vented tank is materially reduced until an altitude is reached where the liquid fuel itself will start boiling or breaking up thereby causing an appreciable loss of fuel through volatilization. While the booster pump can separate the gases and vapors from even a boiling fuel and still prevent vapor lock even at such high altitudes, it is, nevertheless, desirable to minimize the loss of fuel through such breaking up or boiling action.

In accordance with this invention devices are provided for automatically closing the fuel tank vent whenever the pressure on the fuel in the tank is reduced sufficiently so that the fuel can start breaking up or boiling. The pressure within the tank can then build up above the outside pressure since the fuel will volatilize in the closed tank until a pressure is reached which stops this volatilization. Because of the increased pressure, the pumps can continue to draw fuel from the tank.

A safety relief valve is also provided so that the pressure differential between the interior of the closed tank and the exterior of the tank will not exceed a predetermined amount. It is, of course, desirable to utilize lightweight tanks in aircraft and these tanks are not strong enough to withstand great pressure differentials. In accordance with this invention, therefore, the relief valve will vent the closed tanks whenever the pressure differential between the inside and ouside of the closed tank increases beyond a desired amount, as when the aircraft flies to still higher altitudes.

It has been found that a pressure differential of about 4 pounds per square inch is desirable.

By operating the aircraft with a vented tank up to altitudes at which the fuel starts breaking up, and by then sealing the tank to maintain a pressure therein above the ambient air pressure, it is not only possible to avoid the loss of fuel which would otherwise take place at these high altitudes, but to also avoid the necessity for strong, heavy tanks which are required in pressurized fuel systems. Light tanks are usable because, in the system of the present invention, the tank does not become pressurized until high altitudes are reached and therefore a great pressure differential between the interior and exterior of the tank is not needed. Further, the booster pump performance at extremely high altitudes is improved by this pressure differential because the fuel is in a more stable condition than it would be in if the tank were vented. As a net result, the aircraft can be flown to even higher altitudes before vapor lock conditions occur.

In the event of bullet penetration of the closed tanks of this invention, the pressure differential can be released, the tank allowed to seal, and high altitude flight continued with the booster pump acting on fuel vented to the ambient air. In such event the only loss would be through vaporization of some of the fuel, whereas in a pressurized system, the entire system would fail because of inability to maintain the necessary pressure on the fuel and the inability of self-sealing tanks to hold fuel under material pressure differentials.

It is, then, an object of this invention to provide a combination vented and pressurized fuel system.

A further object of the invention is to minimize the loss of fuel due to volatilization in a vented fuel system.

A still further object of the invention is to increase the altitude range of aircraft.

A still further object of the invention is to provide an aircraft fuel system of the vented booster pump type with a vent closing device operative at altitudes wherein the fuel starts breaking up due to reduced pressure.

A still further object of this invention is to obtain the advantages of a pressure type aircraft fuel system while eliminating the disadvantages.

A specific object of the invention is to provide automatic devices for maintaining a constant pressure differential between the inside and outside of an aircraft fuel tank.

Other and further objects of the invention will be apparent to those skilled in the art from the following detailed description of the annexed sheets of drawings which, by way of preferred example, illustrate one embodiment of the invention:

On the drawings:

Figure 1 is a somewhat diagrammatic fragmentary elevational view, with parts broken away and shown in vertical cross section, of one form of aircraft fuel system according to this invention.

Figure 2 is an enlarged fragmentary vertical cross-sectional view of the booster pump and bottom portion of the tank shown in Figure 1.

Figure 3 is an enlarged vertical cross-sectional view of an engine fuel pump taken generally along the line III—III of Figure 1.

Figure 4 is an enlarged vertical cross-sectional view with parts in elevation of the automatic vent seal for the fuel tank of Figure 1.

As shown on the drawings:

In Figure 1 the reference numeral 10 designates an airplane fuel tank containing a pond P of volatile fuel such as gasoline. The reference numeral 11 designates the airplane engine having a fuel and air mixing device such as a carburetor 12 for supplying fuel and air in proper admixture to the intake manifold 13 of the engine. A supercharger 14 can be provided on the engine 13 for supplying air under pressure through a discharge conduit 15 to the carburetor 12.

A booster pump 16 of the centrifugal type is suspended on the bottom of the tank 10 for preparing fully liquid fuel from the pond P and for pressuring this fully liquid fuel through a fuel line 17 into the main fuel pump 18 of the airplane engine 11. This main fuel pump 18 is usually driven by the engine and pressures fuel through a fuel line 19 into the carburetor 12.

As best shown in Figure 2, the booster pump 16 is composed of a casing 20 defining an annular pump volute chamber 21 and having an annular outturned mounting flange 22 for attaching the pump to the bottom wall of the tank 10. The tank 10 has an opening 10a through the bottom wall thereof and a mounting ring 23 is provided in the tank around the opening 10a. Mounting bolts or studs 24 extend through the mounting flange 22 into threaded engagement with the mounting ring 23 for suspending the pump assembly on the bottom wall of the tank.

The volute chamber 21 discharges into an outlet 25 receiving the fuel line 17.

A throat ring 26 is mounted in the opening 10a of the tank on the casing 20 and defines an outwardly flared inlet mouth 27 to the volute chamber 21. An impeller disk 28 spans the inlet mouth 27 and underlaps the throat ring 26. The impeller disk 28 is mounted on the drive shaft 29 of an electric motor 30 carried by the casing 20. The impeller disk 28 has upstanding curved vanes 31 thereon which partially underlap the throat ring 26 and which also extend inwardly to communicate freely with the opening 27. The portions of the vanes 31 which underlap the throat ring serve as pumping vanes to pressure the fuel into the volute chamber 21. The inwardly extending portions of the vanes are uncovered in free communication with the pond of fuel P and serve as agitators or beaters to beat out bubbles B of gas and vapor from the liquid fuel so that only fully liquid fuel reaches the pumping vane portions and the fuel line 17 only receives pressured fully liquid fuel.

The bubbles B liberated by the agitating vane portions rise in an outwardly flaring path along the flaring inlet 27 and thence upwardly through the pond P to the top of the pond where they burst at the surface to liberate the gases and vapors out of the tank vent.

As best shown in Figure 3 the main fuel pump 18 includes an offset rotor 32 of the sliding vane type preferably driven by the engine 11. Fuel received from the fuel line 17 is pressured by the rotor into the fuel line 19.

A by-pass valve 33 is provided to permit the flow of the fuel through the pump 18 in the event of failure of the pump. This valve 33 can be opened by fuel pressure when the booster pump is operated at high or emergency speed to increase the pressure of the fuel in the line 17.

Since the inlet 27 of the booster pump is in constant communication with the volute chamber 21 and thus with the fuel line 17, fuel can be readily drawn through the booster pump by the main fuel pump 18 even though the motor 30 of the booster pump is not driven. Likewise fuel can be by-passed around the pumping element 32 of the main pump 18 in the event of failure of this pumping element.

A relief valve 34 is also provided in the main fuel pump 18. This valve is spring-biased to closed position by means of an adjustable spring 35. A flexible diaphragm 36 bridges the pump housing to divide the same into upper and lower compartments with the lower compartment receiving the fuel therethrough and with the upper compartment being connected through a tube 37 to the discharge line 15 of the supercharger 14. The relief valve 34 allows excess fuel at the pressure selected by adjustment of the spring 35 to return from the discharge to the intake side of the pump 18. The diaphragm 36, by being subjected to fuel pressure on one side and supercharger pressure on the other side, automatically compensates for fluctuations in the air and fuel pressures. Thus if the fuel pressure increases materially fuel on the discharge side of the main fuel pump can be released back to the suction side of the pump.

A constant fuel pressure on the discharge side of the pump can thus be maintained as long as the supercharger delivers a constant air pressure. In accordance with this invention, and as shown in Figures 1 and 4, an automatic tank vent closing device 40 is provided on the top wall of the tank 10. The closing device 40 includes a housing 41 which is bolted on the top tank wall and is connected with a tube 42 opening into the slip stream of the aircraft. The housing 41 is thus vented to the ambient air.

An evacuated bellows 43 is suspended from the top wall of the housing 41 and contains a compressed coil spring 44 tending to expand the bellows.

A valve 45 is carried by the bottom of the bellows 43.

The top wall of the tank 10 is apertured as at 10b and a valve seat defining ring 46 is welded or otherwise secured in the aperture 10b to seat the head 45a of the valve 45.

Atmospheric air pressure acting on the evacuated bellows 43 in the housing 41 will oppose the bellows expanding effort of the spring 44 to unseat the valve head 45a from the seat 46. However, when the air pressure in the housing 41 decreases beyond a predetermined value to a pressure such as would occur at an altitude where it is desired to seal the tank, the bellow collapsing effect is reduced so that the spring 44 will move the valve head 45a into seated position on the seat 46 and thereby close the vent opening 10b.

If desired the bellows 43 can be made so that it will normally tend to move to a collapsed position thereby holding the valve 45 in an open position. Air can be sealed into bellows and as air pressure in the housing 41 decreases to a pressure such as that occurring at an altitude where it is desired to seal the tank, the air in the bellows will be expanded to expand the bellows for closing the valve 45.

The top wall of the tank is also apertured as at 10c and a valve seat 47 is provided in this aperture 10c for seating the head 48a of a relief valve 48 mounted in a second housing 49 on the top of the tank and spring pressed to closed position by means of a coil spring 50. The housing 49 is vented to the ambient air as at 51. Whenever the pressure differential between the interior and exterior of the tank exceeds a predetermined value the relief valve 48 will open to vent the tank.

An air inlet valve 52 is provided for controlling a third vent opening 10d in the top wall of the tank. This valve 52 is mounted in a casing 53 which depends into the tank and is vented to the interior of the tank as at 54. A spring 55 urges the valve 52 into closed position. The vent 10d communicates through a branch tube 42a with the vent tube 42.

Whenever pressure inside of the tank 10 decreases below the ambient air pressure, as, for example, when the aircraft dives to lower altitudes, or when temperature changes cause condensation of fuel vapor in the tank the valve 52 will open to bleed the ambient air into the tank.

Therefore, the top or upper portion of the tank in accordance with this form of the invention has three vents, one of which is automatically controlled by an evacauted bellows to be closed whenever the ambient air pressure surrounding the tank decreases to a predetermined value. The second vent is controlled by a relief valve capable of automatically opening whenever excessive pressures develop in the tank. The third vent is controlled by a bleeder valve which permits the bleeding of amibent air into the tank whenever the pressure in the tank drops below a predetermined pressure differential as compared with the ambient air pressure.

As shown in Figure 1, the electric motor for driving the booster pump 16 is energized from a battery 57 through a circuit 58 including a switch 59 adapted to be moved to an off position marked "O"; a normal speed position marked "N"; and an emergency or high speed position marked "E." When the switch is in the "N" position, the booster pump will operate at normal speed for pressuring fuel into the main pump 18. However, if, for any purpose, the main pump 18 becomes inoperative, the booster pump can be speeded up by moving the switch to the emergency position "E" whereupon fuel will be pressured by the booster pump alone into the engine and through the by-pass 33 of the main pump 18.

In normal operation of the fuel system of Figure 1, the booster pump is not used until altitudes are reached where a vapor lock condition may set in due to reduced ambient air pressure on the fuel in the vented tank. Of course at the lower altitudes the valve 45 is open. The particular altitude at which it is desired to start operation of the booster pump may vary considerably, depending upon temperature of the fuel, nature of the fuel, and the like. Usually the booster pump should be started at altitudes around 10,000 feet so as to insure against development of vapor lock conditions in the fuel line. The tank will remain vented until altitudes are reached where the fuel starts breaking up, whereupon the reduced ambient air pressure on the exhausted bellows 43 will cause the tank vent to be sealed. It has been found that the tank should be sealed at altitudes of about 20,000 feet. After the tank is sealed, a pressure differential is gradually built up. This pressure differential may rise until a differential of about four pounds per square inch, as reached at a much higher altitude. The differential is not allowed to materially rise above four pounds per square inch since the relief valve 48 can open to relieve excess pressure in the tank.

Because the pressure differential is not established until altitudes of about 20,000 feet are reached, the tank can be of lighter construction than a tank required for a closed or pressurized system and still give equal overall performance at any altitude. The sealed tank will prevent loss of volatiles from the fuel and the tendency of the fuel to volatilize even at the pressure existing in the sealed tank will insure proper feed of fuel through the booster pump.

If the aircraft should dive to lower altitudes and cause a rapid cooling and condensation of fuel in the sealed tank, the bleeder valve 52 can open even though the ambient air pressure on the bellows 43 is not sufficient to allow the vent valve 45 to open.

It will be understood, of course, that the booster pump is operated continuously at altitudes above about 10,000 feet.

The altitude range of aircraft equipped with a fuel system of this invention is materially increased and altitudes of 40,000 feet and over can be reached without any fuel system difficulties.

One of the greatest advantages of the fuel systems of this invention over the known pressurized systems is that an airplane equipped with the invention can fly to a much higher altitude with the same pressure differential on the fuel tanks that would cause a simple pressurized system to fail long before such an altitude was reached.

In a simple pressurized system, pressure must be used to force fuel through the line to the carburetor and therefore it must be introduced at low altitudes. Now as the airplane climbs into rarified atmospheres the pressure differential sufficient to force feed the fuel may not be sufficient to prevent vapor evolution in the line to the carburetor, and "vapor lock" can occur. Therefore to prevent "vapor lock" the tank must be superpressured above the pressure necessary for force feeding the fuel.

In the systems of the invention, on the other hand, the booster pump prevents "vapor lock" at any pressure and the pressure differential between the inside and outside of the fuel tank need only be sufficient to prevent excessive loss of fuel volatiles. Thus the fuel can even boil in the tank without causing "vapor lock" in the fuel line, whereas in the simple pressurized system the tank must be pressured sufficiently to prevent boiling and in the rarified atmospheres the pressure differential must be very great. As a result the pressurized systems require strong tanks of heavy construction.

In the systems of this invention, if as assumed, as it is in the industry now, that the maximum fuel temperature to be encountered is 110° F., the usual aviation fuel will start to actively boil in a vented tank at about 20,000 feet altitude and therefore the altitude controlled valve 45 is set to close at about this altitude. Then as long as the fuel temperature remains at 110° F. and the tank remains sealed, the absolute pressure in the tank will remain constant irrespective of altitude. With the aircraft ceiling about 40,000 feet, the differential pressure between 20,000 feet when the tank is sealed and the 40,000 foot ceiling is about four pounds per square inch, and with the relief valve 48 set to open on such a differential pressure, no vapor loss occurs up to 40,000 feet under the conditions chosen.

Due to reduced pressure at the inlet of the engine fuel pump 18 resulting from resistance to flow presented by other units in the system, such as strainers, fuel cocks, etc., vapor may be formed at this point below 20,000 feet and it is thus desirable to start the booster pump 16 at some altitude below that at which actual fuel boiling occurs.

In military aircraft, the tank 10 may be penetrated by bullets and the pressure released. In the systems of this invention the only loss in such event will be loss of some fuel due to volatilization and high altitude flight can be continued with a vented system. In a pressure system, on the other hand, the pressure is lost by penetration of the tank, the known bullet-proof tanks cannot seal bullet holes against pressures sufficient for such pressure systems, and the systems fail.

It will be understood from the above that the invention has all advantages of both a vented fuel system and a pressurized fuel system while, at the same time, the invention eliminates the disadvantages of these systems.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. A combination vented and pressurized fuel system adapted for high ultitude aircraft performance which comprises a fuel tank, a booster pump mounted for receiving fuel from the bottom portion of the tank for delivering fuel from said tank, agitating means on said booster pump for beating out bubbles of gas and vapor from the fuel before pressurizing the fuel, a valve for venting the tank to the ambient air, means for closing said valve whenever the air pressure on fuel in the tank drops below a predetermined pressure, and a relief valve for said tank adapted to open whenever the pressure differential between the inside and outside of the tank exceeds a predetermined value.

2. An aircraft fuel system adapted for high altitude performance which comprises a fuel tank, a booster pump communicating with the bottom portion of the tank for delivering fuel from said tank, agitating means on said pump for beating out bubbles of gas and vapor from the fuel, means for venting said tank to the ambient air at altitudes having air pressures above a predetermined pressure and for sealing said tank at altitudes where the ambient air pressure is below said predetermined pressure, and a pressure relief valve for venting said tank to maintain a predetermined pressure differential between the interior and exterior of the tank when said means seal the tank.

3. The method of delivering gasoline to an aircraft engine as the engine climbs to high altitudes which comprises venting a pond of fuel to the atmosphere at altitudes below about 20,000 feet, sealing the pond at altitudes above about 20,000 feet, allowing volatiles in the fuel to build up an increase in pressure above ambient air pressure on the sealed pond as the pond is being elevated to still higher altitudes, and holding the pressure on the pond of fuel at about 4 pounds per square inch over the ambient air pressure during high altitude flight above 20,000 feet.

4. The method of delivering gasoline to an aircraft engine as the aircraft climbs to high altitudes which comprises venting a pond of gasoline to the ambient air until the air pressure permits volatilization of the gasoline beyond a predetermined rate, automatically sealing the pond whenever the ambient air pressure permits the volatilization rate to exceed said predetermined rate, beating out bubbles of gas and vapor from both the vented and unvented gasoline, allowing the bubbles to rise through the pond of gasoline to burst at the surface and discharge the gas and vapors above the pond to escape to the ambient air when the pond is vented and to be held for acting on the pond when the pond is sealed, and immediately pressuring the beaten gasoline.

5. A combination vented and pressurized fuel system adapted for high altitude aircraft performance which comprises a vented fuel tank, a centrifugal booster pump having an inlet communicating with said tank, a discharge outlet, and pumping means between the inlet and outlet placing the same in constant communication to permit free fuel flow from the tank to the outlet even when the booster pump is idle, agitating means on said booster pump for beating out bubbles of gas and air from fuel in the tank before the fuel is pressurized by the booster pump whereby the bubbles will rise in the tank and discharge the gases and vapors through the tank vent, and means for closing the tank vent to seal the tank whenever the pressure in the tank drops below a predetermined pressure.

6. The method of delivering fuel to an aircraft engine as the aircraft climbs to high altitudes which comprises venting a pond of fuel to the ambient air until the fuel starts breaking up due to reduced air pressure thereon, beating out bubbles of gas and vapor from the fuel, allowing the bubbles to rise in the pond to burst at the surface of the pond and escape to the ambient air, holding the vapors and gases to act on the pond whenever fuel in the pond breaks up due to reduced air pressure thereon, and pressurizing the gas and vapor freed fuel.

7. In a fuel delivery system, a vented fuel tank, a valve for opening and closing the tank vent, and a pressure-sensitive device in constant exposed communication with the ambient air for automatically controlling the valve to close the tank vent whenever the ambient air pressure is sufficiently low to permit the breaking up of fuel in the tank, said device being effective to open the tank vent as soon as the ambient air pressure is great enough to stop breaking up of fuel in the tank.

8. In an aircraft fuel system, a fuel tank, a pump directly receiving fuel from the tank, a tank vent in the top portion of the tank, a conduit connecting the tank vent to the slip stream of the aircraft, a valve for opening and closing the tank vent, and means in the conduit controlling the valve to seal the tank vent whenever the slip stream pressure in the conduit decreases the tank pressure to a point sufficiently low to permit boiling of the fuel and to unseal the tank whenever the slip stream pressure in the conduit is high enough to increase the tank pressure to a point sufficiently high to stop boiling of the fuel whereby fuel vapors in the tank will act on the pond of fuel to increase the inlet pressure on said pump.

RUSSELL R. CURTIS.